US007930680B2

(12) United States Patent
Dumitru et al.

(10) Patent No.: US 7,930,680 B2
(45) Date of Patent: Apr. 19, 2011

(54) XML SCHEMA DESIGN FOR ENVIRONMENT-SPECIFIC TYPES BASED ON BASE TYPES

(75) Inventors: Donald W. Dumitru, Bellevue, WA (US); Joel M. Soderberg, Edmonds, WA (US); Michael Rys, Sammamish, WA (US)

(73) Assignee: Microsoft Corporation, Redmond, MA (US)

( * ) Notice: Subject to any disclaimer, the term of this patent is extended or adjusted under 35 U.S.C. 154(b) by 508 days.

(21) Appl. No.: 11/177,051

(22) Filed: Jul. 8, 2005

(65) Prior Publication Data

US 2007/0011178 A1    Jan. 11, 2007

(51) Int. Cl.
*G06F 9/44* (2006.01)
*G06F 17/00* (2006.01)
*G06F 7/00* (2006.01)

(52) U.S. Cl. ......... 717/114; 715/239; 707/760; 707/808

(58) Field of Classification Search ................ 707/3
See application file for complete search history.

(56) References Cited

U.S. PATENT DOCUMENTS

| | | | | |
|---|---|---|---|---|
| 7,043,487 B2* | 5/2006 | Krishnamurthy et al. | .... | 707/100 |
| 7,089,491 B2* | 8/2006 | Feinberg et al. | ............. | 715/234 |
| 7,096,224 B2* | 8/2006 | Murthy et al. | ................ | 707/100 |
| 7,120,864 B2* | 10/2006 | Cai et al. | ......................... | 715/234 |
| 7,228,312 B2* | 6/2007 | Chaudhuri et al. | ........... | 707/102 |
| 2003/0140308 A1* | 7/2003 | Murthy et al. | ................ | 715/500 |
| 2004/0128296 A1* | 7/2004 | Krishnamurthy et al. | .... | 707/100 |
| 2004/0205562 A1* | 10/2004 | Rozek et al. | ................... | 715/513 |
| 2005/0050068 A1* | 3/2005 | Vaschillo et al. | ............. | 707/100 |
| 2005/0120029 A1* | 6/2005 | Tomic et al. | ................... | 707/100 |
| 2005/0268223 A1* | 12/2005 | Hanson et al. | ................ | 715/513 |
| 2006/0010369 A1* | 1/2006 | Naundorf et al. | ............. | 715/513 |
| 2006/0288021 A1* | 12/2006 | Kojima | ......................... | 707/100 |
| 2007/0162466 A1* | 7/2007 | Claussen et al. | ............. | 707/100 |
| 2007/0168380 A1* | 7/2007 | Chitrapura et al. | ........... | 707/102 |
| 2007/0179988 A1* | 8/2007 | Stoner et al. | .................. | 707/200 |

OTHER PUBLICATIONS

Wang et al. "An Efficient XML Schema Typing System", Technical Report 03-25, School of Information and Computer Science, University of California, Irvine, CA 92697-3425. Nov. 18, 2003.*
Eisenberg et al. "SQL/XML in Making Good Progress" SIGMOD Record, Vol.31, No. 2, Jun. 2002.*
Melton et al. "SQL/XML and the S QLX Informal Group of Companies" SIGMOD Record, vol. 30, No. 3, 2001.*
Eisenberg et al. "Advancements in SQL/XML" vol. 33, Issue 3, Sep. 2004, pp. 79-86.*
ISO/IEC "XML-Related Specification (SQL/XML)" Information technology—Database languages—SQL—Part 14: XML-Related Specifications (SQL/XML), created Jul. 21, 2004.*
Information Technology-Database Languages-SQL-Part 14: XML-Related Specifications (SQL/XML), ISO/IEC JTC 1/SC 32, ISO/IEC Jul. 25, 2003, 9075-14(E), pp. i-xii, 1 thru 255.

* cited by examiner

*Primary Examiner* — Pierre M Vital
*Assistant Examiner* — Berhanu Mitiku
(74) *Attorney, Agent, or Firm* — Woodcock Washburn LLP

(57) ABSTRACT

XML Schema Designs for environment-specific types based on XML base types are disclosed. The invention provides a series of "base types" in the XML Schema. Each base type is in an environment-specific XML Schema namespace that disambiguates the environment's types from all other types defined by any other environment. The XML Schema Design then defines the final type as an anonymous type, derived from the environment-specific base type. The base type is defined with any XML Schema type facets that apply to all derivatives of the base type, and the anonymous final type is defined with additional XML Schema type facets to fully describe the type.

15 Claims, 3 Drawing Sheets

```
<xs:simpletype  name = "p1">
    <xs:restriction   base = "xs:string">
        <xs:maxlength  value = "256">
    </>
</>
```

FIG. 2

```
<xs:simpletype  name = "p1"  sqlattrib:base="sqltypes:string">
    <xs:restriction   base = "xs:string">
        <xs:maxlength  value = "256">
    </>
</>
```

FIG. 3

```
<xs:simpletype  name = "p1">
    <xs:restriction   base = "xs:string">
        <xs:maxlength  value = "256">
    </>
    <xs:annotation ...>
        <sqlanno:basetype = "sqltypes: nvarchar">
    </>
</>
```

FIG. 4

```
<xs:simpletype name = "p1">
    xmlns:sqltypes = "http//schemas/.../microsoft.com"
    <xs:restriction base="sqltypes:nvarchar">
        <xs:maxlength value = "256">
    </>
</>

<xs:schema targetnamespace="http//schemas/.../microsoft.com">
    <xs:simpletype name="nvarchar">
        <xs:restriction base:"xs:string">
    </>
</>
```

XML SCHEMA DESIGN FOR ENVIRONMENT-SPECIFIC TYPES BASED ON BASE TYPES

FIELD OF THE INVENTION

Generally, the invention relates to XML schema designs. More particularly, the invention relates to an XML schema design for environment-specific types based on base types.

BACKGROUND OF THE INVENTION

In designing an XML schema, it is often desirable to define one or more environment-specific base types. As used herein, the term "environment-specific base type" refers to a static type for use in a particular environment. The term "environment" refers to a programming domain, such as SQL server, c++, etc. Different programming domains typically have their own type systems.

Often, when moving data to XML, environment-specific type information is simply thrown away. For example, if data is being exported from Microsoft SQL Server, and the type of the data is NVARCHAR(256) in the SQL_Latin1_General_Cp437_BIN collection, the output schema might simply specify the output type information as xsd:string. In this case, the recipient of such a result would not have any type information available in order to apply environment-specific processing to the data, and would not, for example, be able to properly maintain the sort order for the data when it is displayed in a list with other data. Alternatively, the data might be exported with type annotations. In this case, it might be typed as xsd:string, and an additional annotation of sqltypexsd:sqltypedecl="NVARCHAR(256) SQL_Latin1_General_Cp437_BIN" might be added. The problem with this is that it creates two separate, parallel type systems, and does not describe the types using a derivation system such that behavior associated with a base type can be inherited by derived types. Another option would be to define a set of static XML type which describe all possible environment-specific types. The problem with this is that the set of all possible environment-specific types is enormous, and attempting to define and communicate a static set of all such types would be prohibitively expensive. For example, consider if NVARCHAR can have lengths between 1 and 4096, and if there were 32 known collations. In this case, there would be 4096×32=131,072 distinct type permutations for NVARCHAR alone.

It would be desirable, therefore, if there were available XML schema designs for environment-specific types based on base types.

SUMMARY OF THE INVENTION

The invention provides a series of static "base types" in the XML Schema. Each base type is in an environment-specific XML Schema namespace that disambiguates the environment's types from all other types defined by any other environment. The XML Schema Design then defines the final type, on an as-needed basis, as an anonymous type, derived from the environment-specific base type. The base type is defined with any XML Schema type facets that apply to all derivatives of the base type, and the anonymous final type is defined with additional XML Schema type facets to fully describe the type.

Using the example provided in the Background section, an XML Schema namespace may be defined for Microsoft SQL Server. A type 'nvarchar' may be defined in that XML Schema namespace. An anonymous final type may then be defined as deriving from the 'nvarchar' base type, and type facets describing the length and collation information.

An intermediate processor may be able to recognize the anonymous final types as being eligible for environment-specific programming assistance, by recognizing that they are declared as derivatives of the non-ambiguous environment-specific XML Schema namespace that was defined for that environment. An example of environment-specific behavior which might apply to all instances of nvarchar would be handling of DBNull values. DBNull is an example of an environment-specific behavior, whereby the special value DBNull has specific semantics when comparing two values of type nvarchar.

It should be understood that a method according to the invention may apply not only to the XML Schema for Microsoft SQL Server, but to any XML Schema where base types in an environment-specific namespace are defined, with XML Schema type facets, and then anonymous final types are defined as derivatives of those base types.

BRIEF DESCRIPTION OF THE DRAWINGS

FIGS. 2-4 provide example XML schema type definitions.

DETAILED DESCRIPTION OF ILLUSTRATIVE EMBODIMENTS

Example Computing Environment

Figure 1:
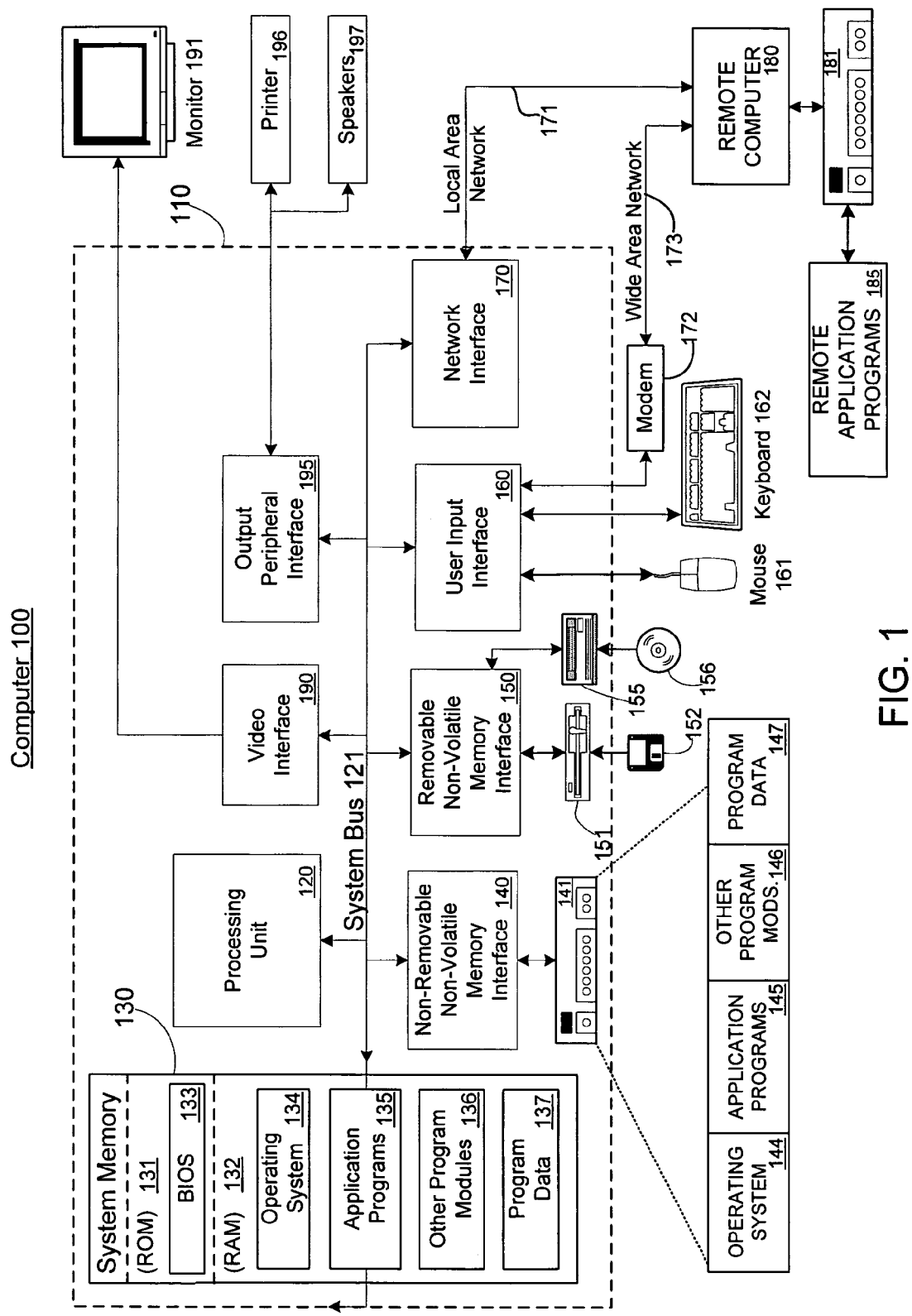
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

XML Schema Design For Environment-Specific Types Based On Base Types

FIG. 2 provides example XML for an XML schema type definition. As shown, a type having name "p1" is being defined. The type "p1" is based on (e.g., a restriction of) a type named "xs:string." The restriction is that the type "p1" is just like a type xs:string, except that the type "p1" has a maximum length of 256. Those skilled in the art will recognize this as a common mechanism for defining types in the XML type system. The XML schema type definition shown in FIG. 2 nowhere indicates the environment associated with the type (i.e., that it is a SQL server type, for example). The definition also does not indicate that, in the specific environment, the defined type might have some extra behavior to it.

One way to solve this would be to add an attribute to the definition of the type. FIG. 3 provides example XML for an XML schema type definition with such an attribute. As shown, the attribute could indicate that the type is a "sqltypes:string," where the namespace "sqltypes" is an alias for a location (e.g., an Internet location) where type information can be found (e.g., http//schemas.microsoft.com/...). Thus, one could see this and infer additional information about the type. Another known approach is depicted in FIG. 4, wherein an xs:annotation XML schema facet is used to contain the annotation. Both of these mechanisms are compliant with the XML schema standard, and both will be recognized by those skilled in the art as being in used in the industry today. This serves to demonstrate that this annotation mechanism has the problem of having ambiguous syntax, and thus requires processors to either require one syntax over another, or to generate and recognize multiple syntaxes, all of which serves to cause interoperability problems.

A method according to the invention for defining an environment-specific XML type may include defining an environment-specific XML Schema name space. Preferably, the environment-specific XML Schema namespace is a unique namespace that disambiguates the environment-specific type from any other types defined by any other environment. The namespace may be specific to a certain environment, or programming domain. Examples of such a programming domain include a computer programming language, such as C++, for example, or a database query language, such as SQL, for example.

An environment-specific XML base type, which may be based on an XML base type, may be defined in the environment-specific name space. The environment-specific XML base type may be defined within an XML namespace. Preferably, the environment-specific XML base type is defined with one or more XML Schema type facets that apply to any or all derivatives of the environment-specific XML base type. The environment-specific XML base type may be based on a non-ambiguous XML base type. In the ideal case, a static environment specific XML schema document would be created which declared all of the environment-specific base types for a particular environment. The actual choice of which types to declare as base types would be based on decisions about the environment-specific type system, such that base types are chosen which "naturally" describe base types in that environment. For example, the concept of some type of "string" is common to many environments, with string types of specific lengths being used to describe particular instances of data. A static set of base types which included a generic string type would thus be natural, while attempting to declare all of the possible string types with lengths included would obviously make the static environment-specific type declaration so large as to be unwieldy.

As concrete types are needed for instances of XML documents, anonymous environment-specific XML type may be derived from the environment-specific XML base type. The environment-specific XML type may be defined with an additional XML Schema type facet to fully describe the environment-specific XML type. One or more restrictions may be added to the environment-specific XML type.

Figures 5, 6:
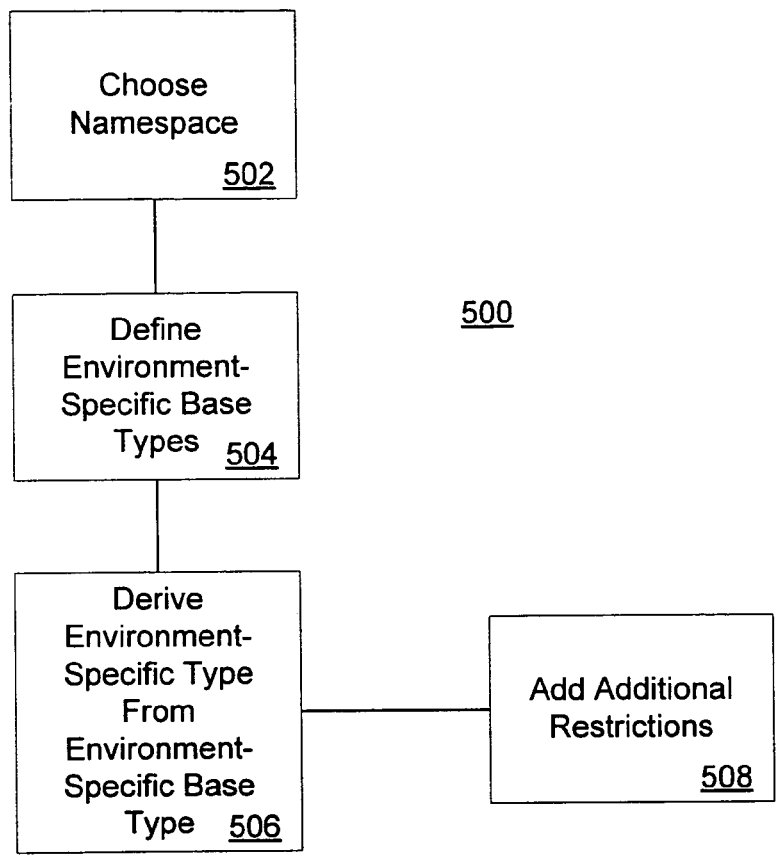
FIG. 5 is a flowchart of a method according to the invention for defining an environment-specific type based on an XML base type.
FIG. 6 provides an environment-specific type definition that is based on an XML base type.

FIG. 5 is a flowchart of a method 500 for defining an environment-specific type based on an XML base type. According to an aspect of the invention, an environment-specific type may be derived from an environment-specific type from an environment-specific base type that is based on an XML base type.

At step 502, an environment-specific XML schema namespace may be chosen. The namespace may be unique for the programming domain (e.g., database). Thus, the namespace may disambiguate the environment-specific type from any other types defined by any other environment.

At step 504, a set of one or more environment-specific base types may be defined with that namespace. Preferably, the smallest possible set of environment-specific base types is defined such that all possible types for that environment (domain) can be described as derivatives of the environment-specific base types.

At step 506, an environment-specific type may be derived from one or more of the environment-specific base types. At step 508, any necessary additional restrictions may be added to the environment-specific type. An example of such an environment-specific type definition is shown in FIG. 6. Such a type definition might include collation information for string types, or a change to the DBNull behavior from the default for that type, or restrictions on the range of values which might be contained within a type derived from a numerical type.

It should be understood that, when dealing with a number of base types, some of them will be more useful if described in shorthand. For example, the fact that a restriction can be defined once, and then later referred to, is useful because the restriction need not be defined every time. Not only does this provide a shorthand description, but the same mechanism also allows for domain-specific recognition. Defining a type system using this type of mechanism may be valuable because it provides a number of advantages, such as these, in same mechanism.

The invention, therefore, solves at least two problems. First, common types may be used as a shorthand, and programming environments enabled to recognize domain-specific types so they can add additional semantics. For example, a type can be predefined, and its attributes inherited by all of its derivations. Thus, the invention provides a more manageable way of associating additional semantics for a particular environment, and controlled size of the static schema to be defined. Additionally, by using techniques according to the invention, one can provide additional information to people who are consuming the XML schemas, without disrupting those who do not recognize that the schema is specifically defined for a particular environment.

Thus, there have been described XML Schema Designs for environment-specific types based on XML base types. Though the invention has been described in connection with certain preferred embodiments depicted in the various figures, it should be understood that other similar embodiments may be used, and that modifications or additions may be made to the described embodiments for practicing the invention without deviating therefrom. The invention, therefore, should not be limited to any single embodiment, but rather should be construed in breadth and scope in accordance with the following claims.

What is claimed:

1. A method for defining an environment-specific XML type, the method comprising:

defining, in a computing environment, an unambiguous environment-specific XML Schema name space wherein the environment-specific XML Schema namespace disambiguates the environment-specific type from other types defined by another environment;

defining, in the environment-specific name space, an environment-specific XML base type, wherein the environment-specific XML base type (a) is based on an XML base type, (b) is not defined by annotation and (c) permits derivation of behavior associated therewith;

defining the environment-specific XML base type with an XML Schema type facet that applies to a derivative of the environment-specific XML base type; and deriving an anonymous environment-specific final type, on an as-needed basis, from the environment-specific XML base type.

2. The method of claim 1, wherein the environment-specific final type is an XML type.

3. The method of claim 1, further comprising:

defining the environment-specific XML base type with an XML Schema type facet that applies to all derivatives of the environment-specific XML base type.

4. The method of claim 1, further comprising:

defining the environment-specific XML base type with all XML Schema type facets that apply to any derivative of the environment-specific XML base type.

5. The method of claim 1, further comprising:

defining the environment-specific final type with an additional XML Schema type facet to fully describe the environment-specific final type.

6. A computer readable storage medium having stored thereon computer executable instructions for defining an environment-specific XML type, the instruction, when executed, perform steps comprising:

defining, in a computing environment, an unambiguous environment-specific XML Schema name space wherein the environment-specific XML Schema namespace disambiguates the environment-specific type from other types defined by another environment;

defining, in the environment-specific name space, an environment-specific XML base type, wherein the environment-specific XML base type (a) is based on an XML base type, (b) is not defined by annotation and (c) permits derivation of behavior associated therewith;

defining the environment-specific XML base type with an XML Schema type facet that applies to a derivative of the environment-specific XML base type; and deriving an anonymous environment-specific final type, on an as-needed basis, from the environment-specific XML base type.

7. The computer readable storage medium of claim 6, wherein the environment-specific final type is an XML type.

8. The computer readable storage medium of claim 6, the instruction further for:

defining the environment-specific XML base type with an XML Schema type facet that applies to all derivatives of the environment-specific XML base type.

9. The computer readable storage medium of claim 6, further for: defining the environment-specific XML base type with all XML Schema type facets that apply to any derivative of the environment-specific XML base type.

10. The computer readable storage medium of claim 6, further for: defining the environment-specific final type with an additional XML Schema type facet to fully describe the environment-specific final type.

11. A system for defining an environment-specific XML type, the system comprising:

a processor configured to:

defining, in a computing environment, an unambiguous environment-specific XML Schema name space wherein the environment-specific XML Schema namespace disambiguates the environment-specific type from other types defined by another environment;

defining, in the environment-specific name space, an environment-specific XML base type, wherein the environment-specific XML base type (a) is based on an XML base type, (b) is not defined by annotation and (c) permits derivation of behavior associated therewith;

defining the environment-specific XML base type with an XML Schema type facet that applies to a derivative of the environment-specific XML base type; and deriving an anonymous environment-specific final type, on an as-needed basis, from the environment-specific XML base type.

12. The system of claim 11, wherein the environment-specific final type is an XML type.

13. The system of claim 11, the processor further configured to:
define the environment-specific XML base type with an XML Schema type facet that applies to all derivatives of the environment-specific XML base type.

14. The system of claim 11, the processor further configured to:
define the environment-specific XML base type with all XML Schema type facets that apply to any derivative of the environment-specific XML type.

15. The system of claim 11, the processor further configured to:
defining the environment-specific final type with an additional XML Schema type facet to fully describe the environment-specific final type.

* * * * *